Oct. 24, 1944.  E. H. LAMBERGER ET AL  2,361,215
SEALED CABLE ENTRANCE
Filed March 12, 1942  2 Sheets-Sheet 1

WITNESSES:
Robert C. Baird
Wm. C. Groome

INVENTORS
Bernard F. Langer and
Edward H. Lamberger.
BY
Paul E. Friedemann
ATTORNEY

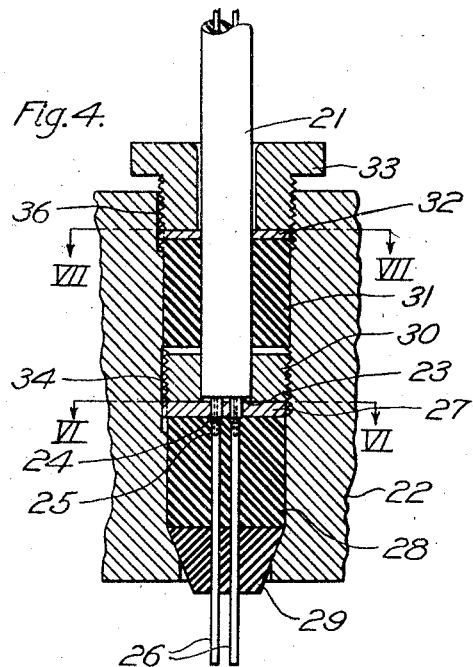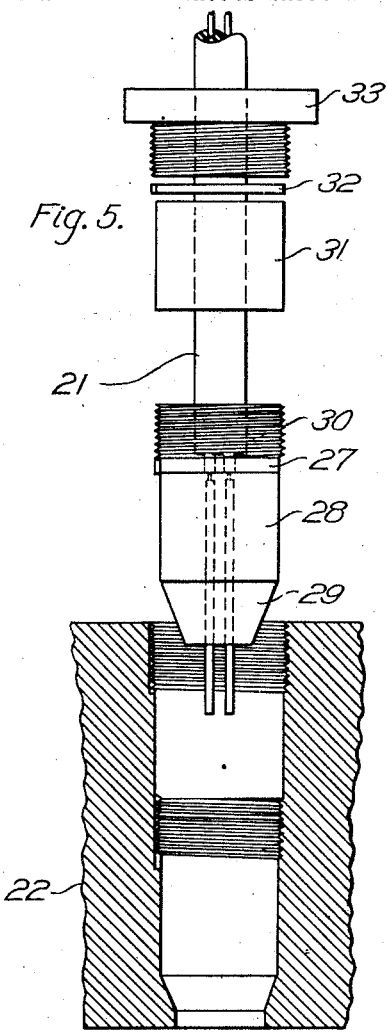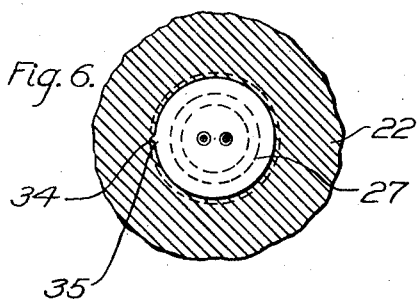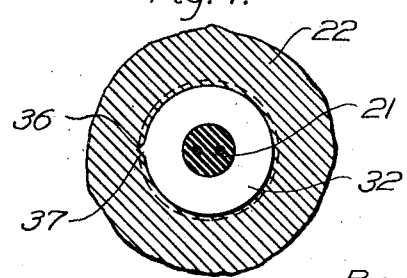

Patented Oct. 24, 1944

2,361,215

UNITED STATES PATENT OFFICE 2,361,215

SEALED CABLE ENTRANCE

Edward H. Lamberger, Wilkinsburg, and Bernard F. Langer, Pittsburgh, Pa., assignors to Westinghouse Electric & Manufacturing Company, East Pittsburgh, Pa., a corporation of Pennsylvania Application March 12, 1942, Serial No. 434,312

5 Claims. (Cl. 174—153)

Our invention relates to electrical connectors and more particularly to sealing means for a cable, or electrical conductors, that are to be carried through a barrier, the opposite sides of which are subjected to differences of fluid pressure.

One object of our invention is to prevent leakage of fluid at the entrance of an electric cable into a receptacle.

A broader object of our invention is to prevent leakage of fluid at an opening in a barrier through which opening electric energy is to be transmitted.

A more specific object of our invention is the provision of a simple, cheap, and easily manufactured elements, to be used with ordinary readily available commercial single-wire, two-wire, three-wire, or many-wire cables, for sealing off liquid at an opening through which a cable is to conduct electric energy.

Other objects and advantages will become more readily apparent from a study of the following specification and the accompanying drawings, in which:

Fig. 4 shows a modification of our invention assembled with all the elements in operative position;

Fig. 5 shows how the elements of our invention may be assembled when the outer end of the cable is not readily available; and Figs. 6 and 7 are sectional views of the modification shown in Fig. 4, the plane of section being indicated by lines VI—VI, and VII—VII, respectively.

During the use of a strain gauge, such as is shown and claimed in our application Serial No. 268,500, filed April 18, 1939, and entitled Oil well strain gage, for use inside of an oil well, where it was necessary to bring electric conductors through the wall of a case, or housing, which has later to be subjected to high hydrostatic pressure the problem of leakage arose. The case was filled with a clean insulating liquid, as transformer oil, and kept at approximately the same pressure on the inside as on the outside of the casing. The problem thus became a dual one, namely, of preventing the liquid on the inside of the casing from leaking out and of preventing the liquid on the outside from leaking into the casing.

Our invention not only presents a solution for this particular problem that confronted us but presents a general solution for all applications where an ordinary commercially available, two-wire, many-wire, or single-wire, cable is to be passed through an entrance where high pressures or even high pressure differences in either direction on the opposite sides of the entrance are involved. Our device has been found satisfactory for pressure differences as high as 2500 pounds per square inch.

Figure 1:
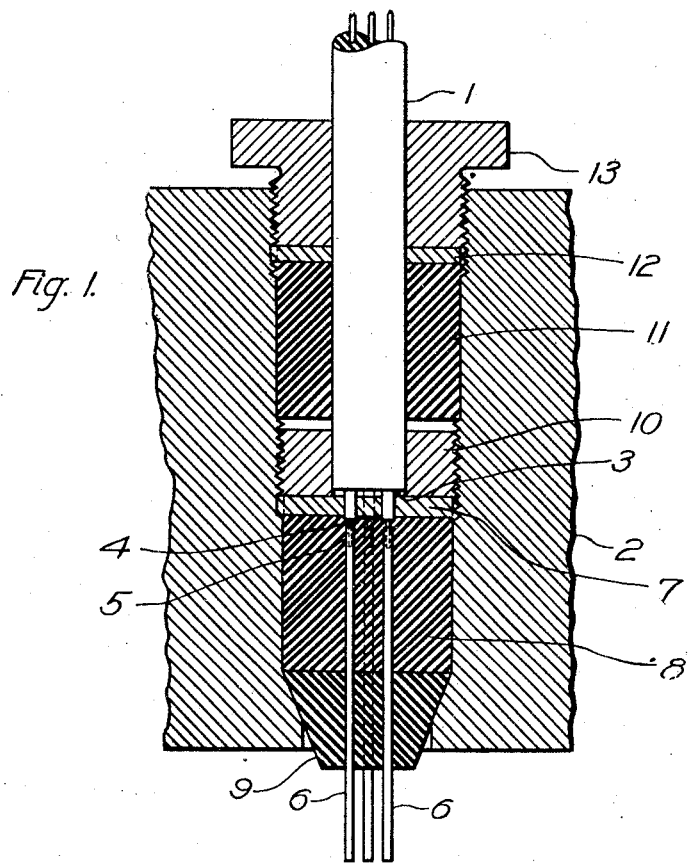
Figure 1 shows our invention assembled and the elements in operative position.

Figures 1, 4 and 5 show the elements of our cable entrance seal in two embodiments. In Fig. 1, I designates an ordinary readily available multiple-wire cable which in its usual form consists of a smooth rubber sheath containing a silk or cotton cord and the required number of rubber insulated stranded conductors. The wall of a housing or any other barrier through which the electric current is to be transmitted is designated by 2.

If the cable were brought all the way through the wall 2, the liquid, say, at the lower side, would be drawn out by the capillary action of the strands, the insulation, and the cord. To prevent any leakage, the outer covering and cord of the cable are cut back to point 3. The insulation around each individual conductor, that is, the group of strands, is cut back to point 4. The bare stranded conductors are cut off at point 5 and each group of strands is soldered to a solid brass, aluminum, or copper prong 6.

Figure 2:
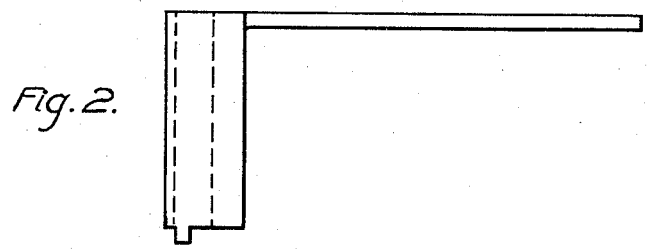
Figs. 2 and 3 show what shape an assembling wrench for our device may take.
Figure 3:

If the outer or upper end of the cable is not available, the elements 10, 11, 12 and 13 are slipped high up on the cable as shown in Fig. 5 to be out of the way. A wrench such as shown in Figs. 2 and 3 may then be slipped over the cable at region 24 for tightening the nut 10, as will be apparent presently. If the outer or upper end is available, then these members may be slipped on the cable during the latter part of the assembly from the outer, or upper end.

If the outer, or upper, end of the cable is available, then the three elements 7, 8 and 9 are slipped over the brass prongs in the order named and in the positions shown. First, a Micarta disc, or washer, 7 containing holes just large enough for the individual insulated conductors, is slipped on, the disc being slipped up snug against the cable at point 3. The distance, or length of insulation left on the conductors, between points 3 and 4 is so chosen as to be substantially equal to the thickness of the disc 7. The disc 7 may of course be some suitable metal or Bakelite or any other phenolic condensation product.

Second, a stopper 8 of rubber, polychloroprene, polyvinyl alcohol, or other rubber-like material, with holes just large enough for the prongs 6 and the bare stranded conductors is slipped on. Third, a tapered plug 9 of Micarta or material similar to disc 7, also with holes just big enough for the prongs 6, is slipped on the prongs.

This assembly of the elements 1, 6, 7, 8 and 9 is then inserted into the hole or entrance in the barrier 2, which may be the wall of a closed housing. An externally threaded steel bushing 10 is then slipped over the outer end of the cable. By means of a special wrench, as shown in Figs. 2 and 3 or a device similar to the device shown in Figs. 2 and 3, engaging the notches in the bushing, it is screwed down on the disc 7. A small amount of lubrication between the engaging surfaces of 7 and 10 may be used. The rubber-like plug 8 expands and coupled with the valve-like action of the plug 9, a liquid tight seal is produced at the surfaces of the prongs 6 and at the walls of the opening. Liquid even under tremendous pressure at the lower side of the barrier will not leak past the prongs or past the plug 8.

In the next operation of the assembly of our seal, a tubing or bushing 11, of material like stopper 8 is slipped over the outer cable end. A flat brass washer 12 is then slipped on, followed by an externally threaded steel bushing 13. This bushing engages threads inside the hole and is tightened down against the brass washer 12 and the rubber tubing 11. The tubing 11 is compressed between washer 12 and the nut 10 and it thus expands laterally against the walls of the hole and the outside of the cable and thus stops the passage of any fluid or liquid into the case from the outside.

One of the great advantages of the seal we have provided is that it can be made from ordinary materials and can be assembled in the field if necessary with very few tools. It is even possible to assemble our seal without having access to the outer end of the cable as explained above and shown in Fig. 5. It is also an advantage that the assembly can be made entirely from one side of the barrier, as for instance, from the outside of a casing.

The nature of the fluids or liquids which must be sealed off determines the materials which are used in the seal. The fluid inside the case for an application such as we made of our device must be an insulator because no means is provided for insulating the ends of the brass prongs from each other except by their spacing. This fluid is usually transformer oil, which means that the stopper 8, and the plug 9 must be made of oil-resistant material. In oil well applications, the outside fluid will be all or part crude oil, salt water, and other solutions which means that the tube 11 and the cable cover must be resistant to the type of liquids likely to be encountered in an oil well since these liquids commonly include salt water—a good electrical conductor. Thus, the salt water must be sealed off to prevent it from getting in to "short" or ground the cable.

In the modification shown in Figs. 4 to 7, inclusive, elements 21 to 33, inclusive, correspond in general structure and arrangement and in function to elements 1 to 13, inclusive.

With the embodiment of our invention shown in Fig. 1, there is sometimes a danger of shearing the conductors off at the regions, or points, 3 and 4. To prevent this shearing of the conductors at points 23 and 24, we provide the lateral wall of the opening with a groove 34 and provide the disc 27 with a projection 35 to fit the groove 34. The disc 27 is thus positively prevented from turning when the nut 30 is tightened down.

A similar groove 36 may be provided at the upper threads and the disc or washer 32 is provided with a projection to fit into groove 36 thus positively preventing any rotation of washer 32.

We do not wish to be limited to the precise details shown and described but wish to be entitled to a full range of equivalents as such equivalents may fall within the scope of the claims hereto appended.

We claim as our invention:

1. An entrance seal for an electric cable having an outer rubber-like casing and a conductor covered with a rubber-like insulating material, in combination, a barrier having an opening therethrough, said opening having a constricted portion at one end, a central threaded region and a threaded region at the other end, said conductor having its casing and insulating covering stripped off for a length at one end, a relatively rigid plug disposed in the opening against the constricted portion, a rubber-like stopper disposed against the plug, said plug and stopper having aligned openings to receive the stripped length of conductor which is disposed through the openings to an extent so that the cable casing extends to near the stopper, an annular nut surrounding the casing and having external threads disposed centrally of the opening and screwed down tight to compress the stopper longitudinally so that it expands and thus forms a seal against fluid leakage at the conductors and the opening, a rubber-like bushing disposed about the cable casing and in the opening near the nut, an externally threaded bushing disposed about the cable casing on the side of the rubber-like bushing remote from the nut, said externally threaded bushing being threaded into the threads of the opening remote from the restricted portion to longitudinally compress the rubber-like bushing to thus by reason of its lateral expansion form a seal against fluid leakage at the cable casing and the walls of the opening.

2. An entrance seal for a conventional electric cable having a rubber-like casing and inner stranded current conducting means, in combination, a barrier of some thickness having an opening therethrough, said cable having its casing removed at one end so that said current conducting means are laid bare for a short distance, smooth solid prong means connected to the current conducting means, the cable being disposed in the opening so that the portion with the casing extends to within the middle half of the opening, a rubber-like material disposed in the opening about the prong means, means for holding said material under pressure at least more than ten times atmospheric pressure in the opening so that an effective seal against fluid leakage is formed at the prong means and the walls of the opening, a rubber-like material disposed in the opening about the casing, and means for holding the last-mentioned material under pressure at least more than ten times atmospheric pressure so that an effective seal against fluid leakage is formed at the cable casing and the walls of the opening.

3. An entrance seal for a conventional electric cable having a rubber-like outer casing and an inner stranded conductor, a barrier of some thickness provided with an opening, said cable having its casing removed for a relatively short length at one end to lay the strands bare, a solid prong connected to the strands, a stop disposed at the lower end of the opening, a rubber-like stopper disposed against the stop, a pressure producing member disposed above the stopper, said stop, stopper, and member being provided with aligned openings to receive the prong, said pressure producing member subjecting the stopper to pressure to thus form an effective fluid seal at the prong and opening walls at the lower half of the opening, a rubber-like bushing disposed about the cable casing and above the pressure producing bushing disposed in the opening above the rubber-like bushing and about the cable casing, said pressure producing bushing subjecting the rubber-like bushing to pressure to thus produce an effective fluid seal at the cable casing and opening walls at the upper half of the opening.

4. An entrance seal for a conventional electric cable having a rubber-like outer casing and an inner stranded conductor, a barrier of some thickness provided with an opening, said cable having its casing removed for a relatively short length at one end to lay the strands bare, a solid prong connected to the strands, a stop disposed at the lower end of the opening, a rubber-like stopper disposed against the stop, a washer disposed above the stopper, a pressure producing member disposed above the washer, said stop, stopper, washer, and member being provided with aligned openings to receive the prong, said pressure producing member being disposed in the opening to subject the stopper to pressure to thus form an effective fluid seal at the prong and walls of the casing at the lower half of the opening, a rubber-like bushing disposed about the cable casing and above the pressure producing member, a second washer disposed about the cable casing above the rubber-like bushing, a pressure producing bushing disposed above the second washer and about the cable casing, said pressure producing bushing, coacting with the second washer, subjecting the rubber-like bushing to pressure to thus form an effective fluid seal at the cable casing and the walls of the opening at the upper half of the opening.

5. An entrance seal for an insulated electric conductor, in combination, a barrier of some thickness having an opening therethrough, said cable having its current conducting means stripped bare of insulation at one end for a short distance, the cable being disposed in the opening so that its unstripped portion extends substantially midway of the opening, a rubber-like material disposed in one end of the opening about the bare conducting means, means for compressing said rubber-like material in the opening so that an effective seal against fluid leakage is formed at the current conducting means and the walls of the opening, a second rubber-like material disposed in the opening about the unstripped portion of the cable, and means for compressing the second rubber-like material so that an effective seal against fluid leakage is formed at the cable casing and the walls of the opening.

EDWARD H. LAMBERGER.
BERNARD F. LANGER.